United States Patent [19]

Beers et al.

[11] 4,054,168
[45] Oct. 18, 1977

[54] FLUID DISPENSING APPARATUS FOR TIRE WHEEL ASSEMBLY

[75] Inventors: Roger N. Beers, Uniontown; Marvin T. Conger, Akron, both of Ohio

[73] Assignee: The Goodyear Tire & Rubber Company, Akron, Ohio

[21] Appl. No.: 677,218

[22] Filed: Apr. 15, 1976

[51] Int. Cl.² ............................................. B60C 17/04
[52] U.S. Cl. .................................. 152/330 L; 152/158
[58] Field of Search ............. 152/158, 330 L, 330 RF

[56] References Cited

U.S. PATENT DOCUMENTS

| | | | |
|---|---|---|---|
| 3,901,301 | 8/1975 | Edwards | 152/330 L |
| 3,903,946 | 9/1975 | French et al. | 152/330 L |
| 3,930,528 | 1/1976 | Harrington | 152/330 L |
| 3,990,492 | 11/1976 | Hyndman et al. | 152/330 L |

Primary Examiner—Drayton E. Hoffman
Attorney, Agent, or Firm—F. W. Brunner; F. Pincelli; F. K. Lacher

[57] ABSTRACT

A fluid-containing bag of sheet material mounted on the radially inner surface of a stabilizer ring as by an adhesive or metal clips for retaining fluid during normal inflated operation of the tire and releasing the fluid in response to rotation of the tire tread portion in engagement with the radially outer surface of the stabilizer ring. The fluid may be released by an increase in temperature softening a plug in the wall or the adhesive in a seam between walls of the bag. The fluid may also be released by the rupture of a flexible tube extending from the bag to the radially outer surface of the stabilizer ring.

5 Claims, 14 Drawing Figures

FLUID DISPENSING APPARATUS FOR TIRE WHEEL ASSEMBLY

This invention relates to fluid-dispensing apparatus for use with a tire stabilizer ring inside a tire cavity to lubricate and cool the tire when the tire is operated in the deflated condition.

Heretofore, various devices have been provided for dispensing fluid inside a tire. These have included fluid containers of rupturable containers of sheet material adhered to the lower sidewalls of a tire in the tire cavity where they will be pinched and burst when the tire is run in the deflated condition. These containers are subject to substantial loading due to centrifugal force tending to separate the containers from the tire sidewall. This loading may exceed 320 times the actual weight of the container and fluid contents at a speed of 100 miles per hour and, as a result, it is difficult to provide an adhesive suitable for fastening of the containers to the tire sidewall.

Fluid containers have also been mounted on a stabilizer ring within a tire cavity and reference is made to the copending U.S. patent application Ser. No. 563,601 of James T. Harris which issued as U.S. Pat. No. 3,961,728 for Fluid Container Mounting Method and Apparatus, filed Mar. 31, 1975 and Ser. No. 563,602 of J. R. Hyndman and K. W. McIntosh which issued as U.S. Pat. No. 3,990,492 for Fluid Dispensing Apparatus for Tire Wheel Assembly, filed Mar. 31, 1975. These applications which have the same assignee as this application are directed to tubular or spherical containers fastened to the radially inner surface of a stabilizer ring and having passages leading from the containers to the radially outer surface of the ring. The containers have been either clamped to the radially inner surface of the stabilizer ring by metal straps or mounted in holes extending through the stabilizer ring. These fluid containers have been satisfactory; however, there has been a need for a fluid container which will provide the same results in a more economical manner, with a minimum installation cost and which is compatible with assembly line practices in the automobile industry.

An object of this invention is to provide an automatic fluid-dispensing apparatus for a tire wheel assembly having a stabilizer ring in which the disengaging stresses on the adhesive holding the fluid container in position are low to avoid and prevent disengagement of the container during operation of the tire wheel assembly.

Another object of the invention is to provide a fluid-container of sheet material which will release fluid from the container in response to rotation of the tread portion of the tire in engagement with a radially outer surface of the stabilizer ring.

A further object is to provide for release of the fluid in response to an increase in temperature above a predetermined level.

A still further object of the invention is to provide an opening in the wall of the container having a closure of temperature-responsive material.

Another object of the invention is to provide a container having walls with seams which will open at a predetermined temperature to release fluid.

A further object of the invention is to provide a container having an outlet tube extending from a position on the radially inner surface to a position on the radially outer surface of the stabilizer ring for rupturing under shear stresses resulting from operation of the tire in the deflated condition.

A still further object is to provide a resilient clip for fastening the container and tube to the stabilizer ring.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but some of the various ways in which the principles of the invention may be employed.

In the annexed drawings:

FIG. 15 is a fragmentary sectional view like FIG. 11 of a further modification of the invention in which the fluid container and outlet tube are fastened to a resilient clip snapped over the edge of the stabilizer ring.

Figure 2:
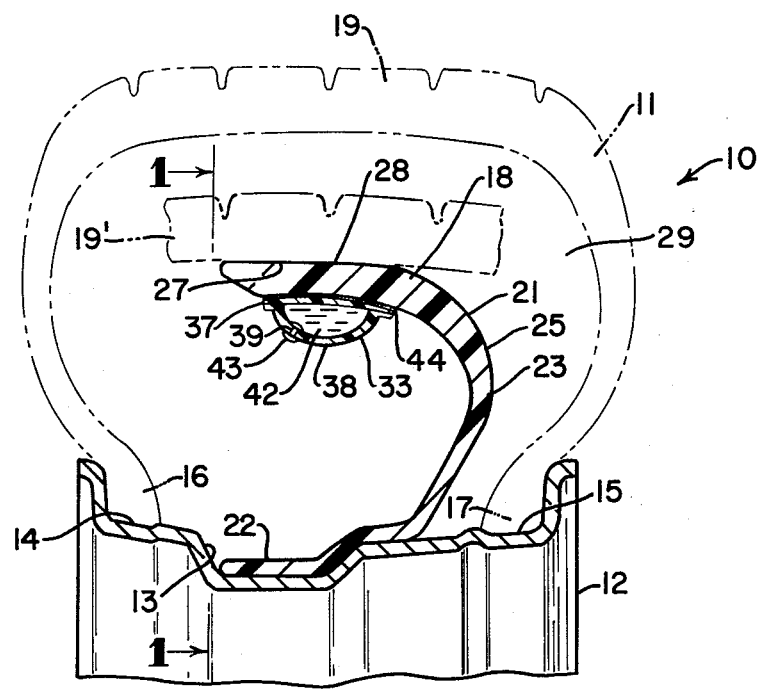
FIG. 2 is a cross-sectional view taken along the plane of line 2—2 of FIG. 1 showing the contour of the tire in chain-dotted lines in the inflated and deflated condition mounted on the rim.
Figure 3:
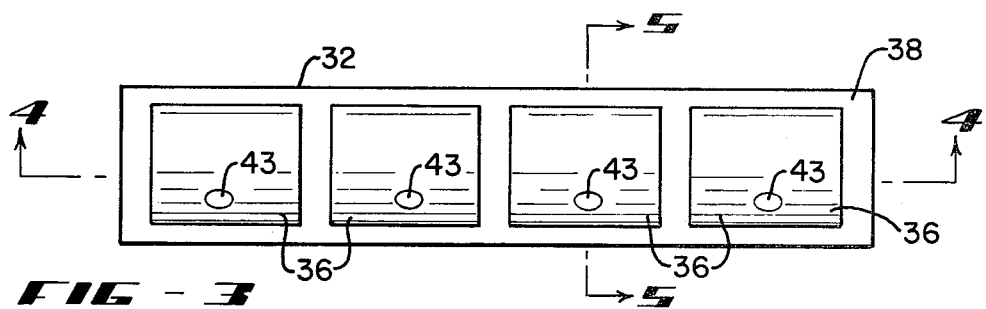
FIG. 3 is a plan view of one of the fluid containers embodying the invention prior to installation on the stabilizer ring.

Referring to the drawings and particularly to FIG. 2, a tire wheel assembly 10 is shown in which an annular tire 11, drawn in chain-dotted lines, is mounted on a rim 12 which may be of the drop center type. The rim 12 has a drop center portion or well 13 with bead seat portions 14 and 15 on each side thereof for receiving tire beads 16 and 17, respectively, of the tire 11 shown in the inflated condition.

A wheel-supported stabilizer ring 18 is mounted inside the tire 11 at a position spaced radially outward of the rim 12 and radially inward of tread portion 19 of the tire in the inflated condition. The stabilizer ring 18 may be part of an annular member 21 having a rim-engaging portion 22 and a substantially radially extending portion or web 23 extending from the rim-engaging portion to the stabilizer ring. The annular member 21 may be divided into two halves 24 and 25, each being made of a single unitary piece, preferably of a material such as fiberglass-reinforced plastic. The annular member 21 may, however, be of a single unitary piece and may be made of other materials if they have the required physical properties, especially to provide radial deflection for cushioning the vehicle when the tire 11 is deflated and the tread portion 19 is in engagement with the stabilizer ring 18 as indicated by numeral 19' in FIG. 2. Where the annular member 21 is a one-piece member having a circumferentially continuous stabilizer ring 18, it may be mounted on a split rim of a vehicle wheel.

In the present embodiment, the rim-engaging portion 22 is seated in the well 13 of rim 12. Angle brackets 26 are bolted on the ends of the ring halves 24 and 25 and then bolted together to provide the annular member 21. The stabilizer ring 18 has a radially inner surface 27 spaced radially outward from the rim-engaging portion 22. The stabilizer ring 18 also has a radially outer surface 28 which is spaced radially inward of the tread portion 19 when the tire 11 is in the inflated condition. As shown in FIG. 2, the stabilizer ring 18 is located within a tire cavity 29 for supporting the tread portion 19' of the tire 11 in the deflated condition.

As shown in FIGS. 1 through 5, fluid containers 32, 33, 34 and 35 are mounted at circumferentially spaced-apart positions on the radially inner surface 27 of the stabilizer ring 18. Each of the fluid containers 32 through 35 have the same construction and therefore the following description of fluid container 32, shown in FIGS. 3 through 5, will also apply to the fluid containers 33, 34 and 35.

The fluid container 32 may include one or more fluid-containing bags 36 having a mounting wall 37 and a cover wall 38 which may be of a flexible sheet material such as polyvinyl chloride. The mounting wall 37 and cover wall 38 may be heat-sealed at spaced-apart positions to form a blister pack made of the fluid-containing bags 36. An opening 39 may be provided in the cover wall 38 of each of the bags 36 for filling the bags with fluid 42 and emptying fluid from the bags. The fluid 42 may be a lubricant including lubricants for rubber such as water and oils as well as antifreeze solutions such as alcohol and ethylene glycol. The fluid 42 may also contain a composition capable of sealing a puncture as well as a volatile liquid for partially reinflating the tire 11 through volatilization of the lubricant at the temperature generated by running of the tire in a deflated or partially deflated condition. The opening 39 in each of the bags 36 may be closed by a closure such as fusible plug 43 of a resin having a relatively low melting temperature such as a hot melt polyamide. The material of the plug 43 has a fusion temperature higher than the normal temperature in the tire cavity 29 during normal operation of the tire 11 in the inflated condition. The plug 43 may also be of beeswax.

Figure 1:
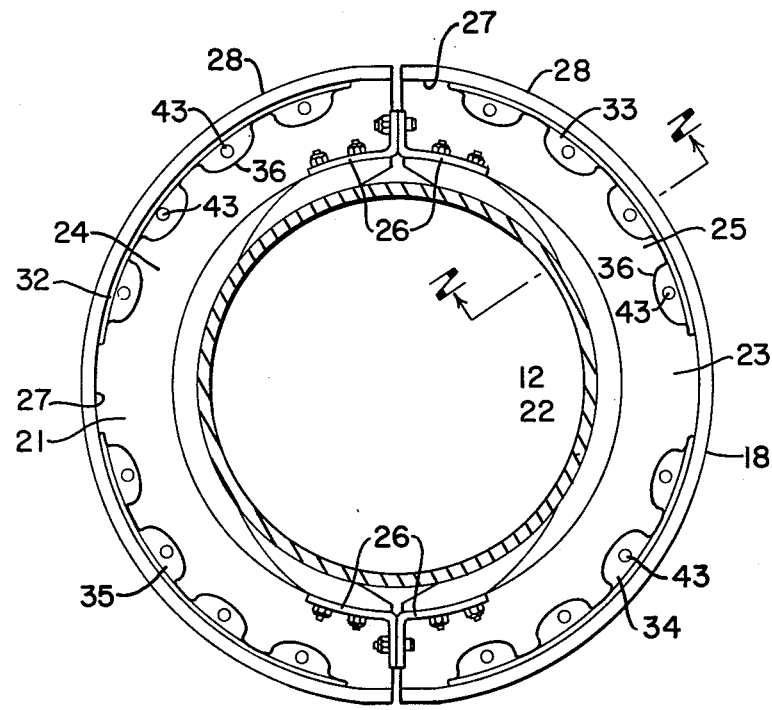
FIG. 1 is a cross-sectional view taken along the plane of line 1—1 of FIG. 2 showing a side elevation of the fluid-dispensing apparatus of this invention.
Figure 4:
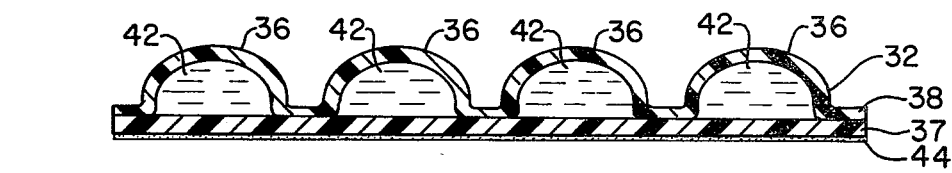
FIG. 4 is a cross-sectional view of the fluid container taken longitudinally along the plane of line 4—4 in FIG. 3.
Figure 5:
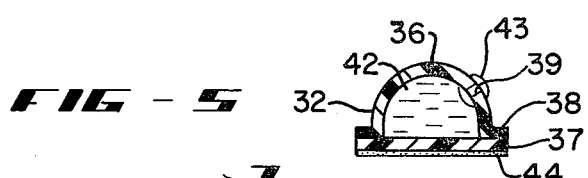
FIG. 5 is a cross sectional view taken transversely of the container along the plane of line 5—5 in FIG. 3.

As shown in FIGS. 2, 4 and 5, the mounting wall 37 is coated with an adhesive 44 for adhering the fluid containers 32 through 35 to the radially inner surface 27 of the stabilizer ring 18. The adhesive 44 may be of a suitable material such as polyvinyl acetate and be pressure sensitive for applying to the bonding side of the mounting wall 37 prior to installation on the radially inner surface 27 of the stabilizer ring 18. The bags 36 of the fluid containers 32 through 35 may also be filled with fluid 42 prior to installation on the stabilizer ring 18. In this way, the installation which may be done on an assembly line for an automobile manufacturing plant only requires pressing the fluid containers 32 through 35 on the radially inner surface 27 of the stabilizer ring 18 at equally spaced-apart positions as shown in FIG. 1, which positions may be marked on the stabilizer ring reducing the time and skill necessary for installation to a minimum.

In operation, the fluid containers 32 through 35 will rotate with the stabilizer ring 18, annular member 21, rim 12 and tire 11. It will be seen that the forces generated by the rotation of the tire 11 will urge the containers 32 through 35 radially outward against the radially inner surface 27 and serve to increase the sealing and adherence of the mounting wall 37 to the stabilizer ring 18. When the tire 11 is deflated by a puncture or blowout, the tread portion 19' will engage the ring 18 in the ground-engaging area as shown in FIG. 2, resulting in an increase in temperature in the tire cavity 29. When the temperature in the tire cavity 29 increases to a predetermined temperature above the normal operating temperature, the plug 43 of each of the bags 36 will melt and the fluid 42 will be released to provide for lubricating the surface of the tread portion 19' which is deflected into engagement with the radially outer surface 28 of the stabilizer ring 18. The fluid 42 also serves to cool the tire wheel assembly 10 when it is operating with the tire 11 in the deflated condition.

Figure 6:
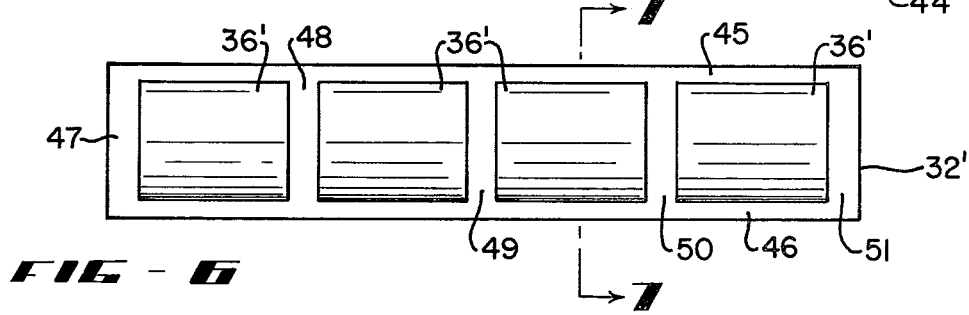
FIG. 6 is a plan view of a modified form of container.
Figure 7:
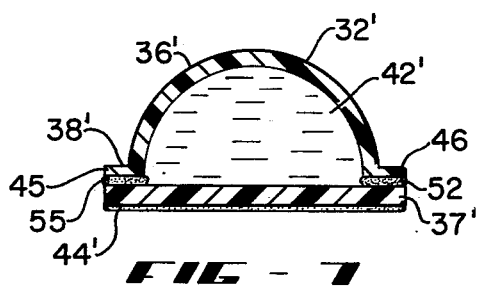
FIG. 7 is a transverse cross-sectional view taken along the plane of line 7—7 in FIG. 6 showing the fluid container filled with fluid.
Figure 8:
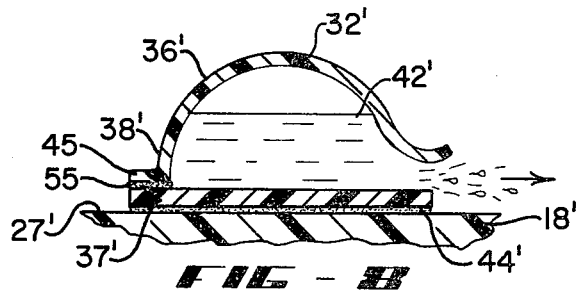
FIG. 8 is a sectional view like FIG. 7 of the container mounted on the stabilizer ring showing one of the seams of the container separated for release of the fluid.
Figure 9:
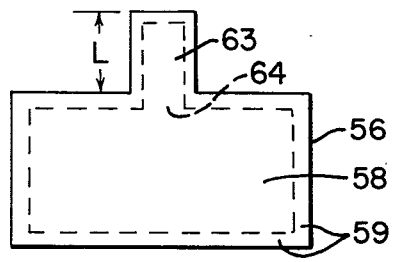
FIG. 9 is a plan view of another modification of the invention.

Referring to FIGS. 6, 7 and 8, a modified form of fluid container 32' is shown having a mounting wall 37' and a cover wall 38' of sheet material such as polyvinyl chloride. The mounting wall 37' and cover wall 38' are held together at longitudinal seams 45 and 46 and transverse seams 47 through 51 in sealing engagement to form bags 36' for containing a lubricating and cooling fluid 42'. At least one of the seams 47 through 51 for each of the bags 36' is held together by an adhesive 52 having a predetermined softening temperature higher than the normal operating temperature of the tire cavity 29 during normal operation of the tire 11.

In the present embodiment, the longitudinal seam 46 contains the adhesive 52 of polyvinyl acetate with a softening point below 100° C. for holding the edges of the mounting wall 37' and cover wall 38' together in sealing relationship as shown in FIG. 7. The other longitudinal seam 45 and transverse seams 47 through 51 may be held together by an adhesive 55 having a higher temperature softening point than that of the adhesive 52. Alternatively, these seams 45 and 47 through 51 may be heat sealed to provide the necessary strength and sealing.

A pressure sensitive adhesive 44' may be applied to the mounting wall 37' of the fluid container 32' to facilitate mounting of the container 32' and other containers 33' through 35' (not shown) on the radially inner surface 27' of the stabilizer ring 18' as shown in FIG. 8.

In operation, when the tire 11 is operated in the deflated condition and the temperature in the tire cavity 29 is increased above normal, the adhesive 52 in the seam 46 will be softened and the fluid 42' will be released through the open seam as shown in FIG. 8.

Referring to FIGS. 9 through 12, a further modification of the invention is shown in which a fluid container or bag 56 of sheet material such as polyvinyl chloride has a mounting wall 57 and a cover wall 58 which are sealed at peripheral edges 59 to provide a container for fluid 62. An outlet tube 63 extends outwardly from one of the peripheral edges 59 at an opening 64 in the seam at the peripheral edges. Preferably, the outlet tube 63 has a length L which is sufficient for the tube to extend from a radially inner surface 27" on which the bag 56 is mounted around an edge 65 of the stabilizer ring 18" to a radially outer surface 28". An adhesive 66 for adhering the bag 56 to the radially inner surface 27" of the ring 18" may be of a pressure sensitive type such as polyvinyl acetate and applied to the surface of the bag 56 prior to installation on the radially inner surface 27". An adhesive 67 may also be applied to the surface of the outlet tube 63 prior to installation and mounting on the radially outer surface 28" of the stabilizer ring 18". This adhesive 67 may be a pressure sensitive material of polyvinyl acetate but preferably has a greater adhering strength than the adhesive 66 to withstand the centrifugal forces during operation of the tire wheel assembly 10'.

Figure 10:
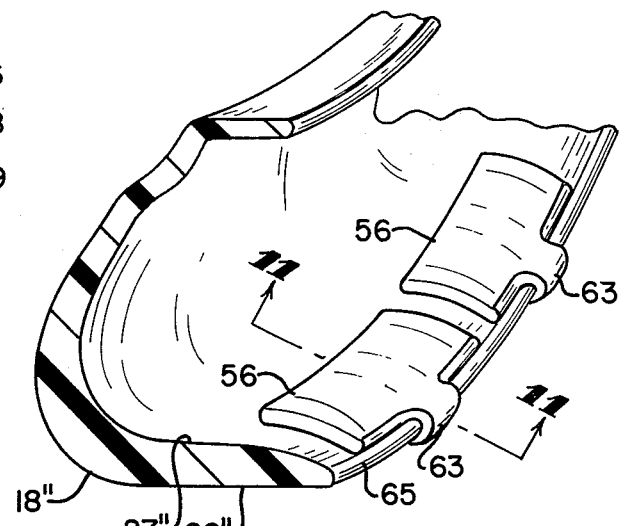
FIG. 10 is a fragmentary perspective view of the stabilizer ring showing the fluid containers of FIG. 9 mounted thereon.
Figure 11:
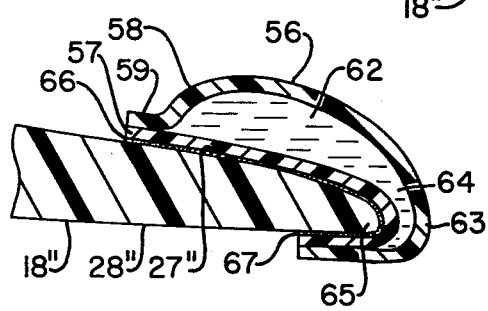
FIG. 11 is a fragmentary sectional view taken along the plane of line 11—11 of FIG. 10 showing one of the containers filled with fluid.

As shown in FIG. 10, the bag 56 is mounted on the stabilizer ring 18" at the radially inner surface 27" with the outlet tube 63 extending around the edge 65 to the radially outer surface 28". A number of these bags 56 may be mounted at spaced-apart positions around the stabilizer ring 18".

Figure 12:
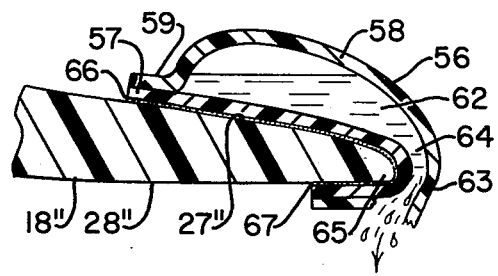
FIG. 12 is a fragmentary sectional view like FIG. 11 showing the fluid container of FIG. 11 with the outlet tube ruptured for releasing the fluid during operation of the tire in the deflated condition.

In operation, the fluid 62 is sealed in the bag 56 and is held there at the radially inner surface 27" of the stabilizer ring 18" during normal operation of the tire 11. The outlet tube 63 is of a flexible resilient material and will withstand impacts from the tread portion 19 of the tire 11 which may be caused by running over chuck holes or other blows on the tire. When the tire 11 is deflated, the tread portion 19 will engage the radially outer surface 28" subjecting the walls of the outlet tube 63 to shear stresses and causing rupturing of the tube, as shown in FIG. 12, for releasing the fluid 62 into the tire cavity 29.

Figure 13:
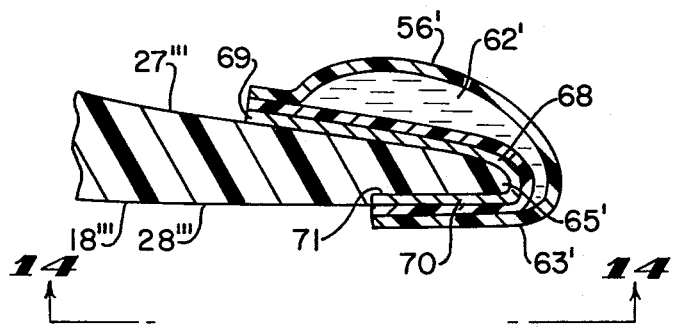
Figure 14:
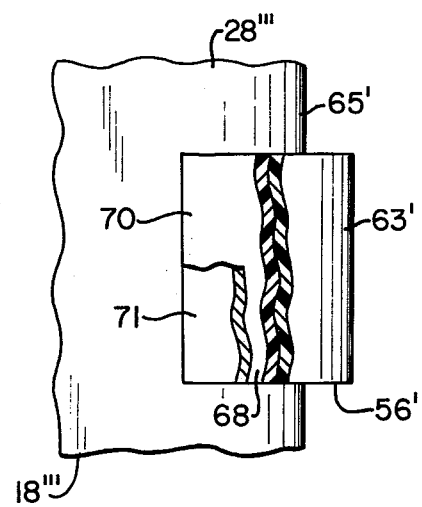
FIG. 14 is a fragmentary view of the container shown in FIG. 13 taken along the plane of line 14—14 with parts being broken away to show the slot in the edge of the stabilizer ring for receiving a leg of the clip.

A further modification of the invention is shown in FIGS. 13 and 14 in which the bag 56' and outlet tube 63' are fastened to a U-shaped resilient clip 68 of a suitable material such as steel. The clip 68 has a first leg 69 to which the bag 56' is attached for overlapping and gripping radially inner face 27''' of the stabilizer ring 18'''' and a second leg 70 which fits in a groove 71 in the radially outer face 28''' of the stabilizer ring and to which the outlet tube 63' is fastened. As shown in FIGS. 13 and 14, the bag 56' contains a fluid 62' and may be installed over the edge 65' of the stabilizer ring 18'''' simply by pushing the resilient clip 68 over the edge with the second leg 70 fitting in the groove 71. In operation of the modification shown in FIGS. 13 and 14, the outlet tube 63' has sufficient strength to withstand stresses from impacts during operation of the tire 11 in the inflated condition and will rupture under shear stresses resulting from operation of the tire in the deflated condition which will release the fluid 62' for lubricating and cooling the tire wheel assembly 10.

While polyvinyl chloride has been given as an example of the flexible sheet material suitable for the walls of the fluid containers, and outlet tubes of this invention, it is understood that other thin gauge materials may also be used. These other thin gauge materials include composite structural films such as laminates of aluminum foil with the following polymers: polyester, polyvinyl chloride, polyvinyl acetate, polyethylene or combinations of these polymers which provide the barrier and strength properties desired. It is also understood that even though certain representative embodiments and details have been shown for the purpose of illustrating the invention, it will be apparent to those skilled in the art that various changes and other modifications may be made therein without departing from the invention.

What is claimed is:

1. A fluid container for mounting on the radially inner surface of a stabilizer ring positioned within a tire cavity radially outward of a wheel rim and radially inward of a tread portion of a tire with said ring having a radially inner surface and a radially outer surface engageable with a tread portion of said tire in the deflated condition of said tire comprising a fluid-containing bag having walls of flexible sheet material, at least two of said walls are connected at a seam in overlapping relation, an adhesive interposed between said radially inner surface of said ring and said first one of said walls of said bag for mounting said bag on said ring and fluid releasing means responsive to rotation of said tread portion in engagement with said radially outer surface of said ring to provide communication between the space within said bag and the space within said tire cavity for release of said fluid, said fluid releasing means includes an adhesive interposed between and holding said walls together in sealing relationship at said seam, said adhesive having a predetermined softening temperature higher than the normal operating temperature of said tire during operation in the inflated condition whereby said fluid will be released from said bag at said seam when the operation of said tire in the deflated condition generates sufficient heat to raise the temperature above said predetermined softening temperature.

2. A fluid container according to claim 1 wherein said walls of said bag are of polyvinyl chloride and said adhesive is a polyvinyl acetate having a softening point at a temperature below 100° C.

3. A fluid container for mounting on the radially inner surface of a stabilizer ring positioned within a tire cavity radially outward of a wheel rim and radially inward of a tread portion of a tire with said ring having a radially outer surface engageable with a tread portion in the deflated condition of said tire comprising a fluid-containing bag having walls of sheet material, said bag having peripheral edges, a first fastening means for mounting a first one of said walls on said radially inner surface of said ring, fluid releasing means responsive to rotation of said tread portion in engagement with said radially outer surface of said ring including a tube extending away from one of said peripheral edges, said tube having a sufficient length to extend from said radially inner surface to said radially outer surface of said stabilizer ring, a second fastening means to adhere said tube to said radially outer surface and said tube having sufficient strength to withstand stresses from impacts during operation of said tire in the inflated condition and to rupture under shear stresses resulting from operation of said tire in the deflated condition providing communication through said tube between said space within said bag and said space within said tire cavity for release of said fluid.

4. A fluid container according to claim 3 wherein said first fastening means includes an adhesive interposed between said radially inner surface of said ring and said first one of said walls of said bag and said second fastening means includes an adhesive interposed between said tube and said radially outer surface of said ring.

5. A fluid container according to claim 3 wherein said first fastening means and said second fastening means include a U-shaped resilient clip having a first leg for overlapping said radially inner surface and a second leg for overlapping said radially outer surface, said bag being fastened to said first leg and said tube being fastened to said second leg whereby said fluid container may be snapped over said ring to facilitate installation and removal.

* * * * *